United States Patent
Bacus

(10) Patent No.: US 9,519,625 B2
(45) Date of Patent: Dec. 13, 2016

(54) ACCURATE FONT ACTIVATION

(75) Inventor: Mike Bacus, Tigard, OR (US)

(73) Assignee: Celartem, Inc., Portland, OR (US)

( * ) Notice: Subject to any disclaimer, the term of this patent is extended or adjusted under 35 U.S.C. 154(b) by 565 days.

(21) Appl. No.: 12/774,929

(22) Filed: May 6, 2010

(65) Prior Publication Data

US 2011/0273734 A1    Nov. 10, 2011

(51) Int. Cl.
  *G06K 15/02* (2006.01)
  *G06F 17/21* (2006.01)
  *G06K 15/00* (2006.01)

(52) U.S. Cl.
  CPC ............. *G06F 17/214* (2013.01); *G06K 15/02* (2013.01); *G06K 15/00* (2013.01)

(58) Field of Classification Search
  CPC  G06K 15/00; G06K 15/02; G06K 2215/0008; G06F 3/1296; G06F 3/1297; G06F 17/214; H04N 1/00204; H04N 2201/0082; H04N 2201/0094
  USPC ..... 358/1.11, 1.15, 1.16, 1.9, 2.1, 3.23, 3.31
  See application file for complete search history.

(56) References Cited

U.S. PATENT DOCUMENTS

| | | | | |
|---|---|---|---|---|
| 6,111,654 | A | * | 8/2000 | Cartier et al. ............... 358/1.16 |
| 2003/0002063 | A1 | * | 1/2003 | Oomura et al. ............. 358/1.11 |
| 2007/0263240 | A1 | * | 11/2007 | Hirai ........................... 358/1.11 |
| 2008/0024806 | A1 | | 1/2008 | Bacus et al. |

FOREIGN PATENT DOCUMENTS

| | | |
|---|---|---|
| JP | 2003015849 A | 1/2003 |
| JP | 2003058528 A | 2/2003 |
| JP | 2007304764 A | 11/2007 |
| JP | 2009086879 A | 4/2009 |
| WO | 2007050816 A2 | 5/2007 |

OTHER PUBLICATIONS

Extended European Search Report dated Jun. 24, 2014 in Application No. 11165196.4.
Long, Ben, "Extensis Suitcase 10: Heir to the Font-Management Throne?," Jul. 31, 2001, retrieved from http://www.creativepro.com/printerfriendly/story/14021.htm, 4 pages.
Neuburg, Matt, "Fontastic Voyage: Font Reserve 2.5," Mar. 8, 2000, retrieved from http://db.tidbits.com/article/5837, 4 pages.

(Continued)

*Primary Examiner* — Vu B Hang
(74) *Attorney, Agent, or Firm* — Banner & Witcoff, Ltd.

(57) ABSTRACT

Systems and methods are presented that process documents, identify fonts being used to reproduce the documents, and identify conflicts based on the identified fonts. The systems and methods may identify a font associated with a document, identify a conflict between the font and another font, determine a substitute font for the document, and then modify information of the substitute font and the document based on the conflict to prevent the identified conflict from causing the document to be incorrectly processed. The systems and methods may then allow the document to be further processed based on the modified information.

22 Claims, 5 Drawing Sheets

(56) References Cited

OTHER PUBLICATIONS

"Font Reserve Reviewer's Guide—Version 3.1," 2003, retrieved from http://dl.extensis.com/downloads/FR/EN/P/FontReserve3.1 Reviewers_Guide.pdf, 18 pages.
Phinney, Thomas,"Adobe Typekit Blog: InDesign Font Conflicts," May 8, 2008, retrieved from http://blog.typekit.com/2008105/08/ indesign_font_conflicts, 6 pages.
Feb. 15, 2015 (JP) Notice of Reasons for Rejection with English Translation—App No. JP2011-013715.
Apr. 15, 2015 (CN) The First Office Action—App. 2011101879173.

* cited by examiner

ACCURATE FONT ACTIVATION

FIELD OF ART

The invention is generally directed to managing fonts, and more particularly to a system and method for accurately activating fonts.

BACKGROUND

Document creation programs, document processing programs, desktop publishing applications, web publishing, document printing applications and other computer programs conventionally allow users to select different fonts for creating and printing documents. As the number of fonts has increased over the years, it has become more difficult for users to manage different fonts. For example, a font may conflict with another font. Such a conflict may cause the wrong font to be activated and/or used by the computing system when documents having the conflicting fonts are processed by the computing system. Accordingly, the font conflict may cause the computing system to incorrectly process a document (e.g., incorrectly load, view, print, etc.). Further, the computing system and/or the timing of the document processing may determine whether a font conflict arises, and thus may determine whether the computing system incorrectly processes the document. For example, a font conflict may or may not arise depending on the timing of the font activation, the timing of the document processing, and/or the operating system of the computing system.

Therefore, in light of the above, it would be advantageous to provide a system and method to ensure accurate font activation so that when a document is used, printed, rendered, etc., the correct fonts are selected, activated and used when the document is processed. Additionally or alternatively, in light of the above, it would be advantageous to provide a system and method to ensure accurate font activation by resolving one or more font conflicts before the font conflict causes the computing system to incorrectly process the documents.

BRIEF SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Aspects of this disclosure relate to systems and methods for determining conflicts and resolving font conflicts in one or more documents. Still further aspects of this disclosure relate to systems and methods for accurately activating fonts for various document processing purposes, including, for example, document printing. Still further aspects of this disclosure relate to systems and methods for resolving one or more font conflicts before the font conflict causes a computing system to incorrectly process the documents.

According to at least some aspects of the disclosure, a computing system environment is provided that determines and prevents the font conflicts from arising. According to some aspects of the disclosure, one or more fonts may be identified and a font conflict may be determined based on the identified fonts. According to some aspects of the disclosure, a substitute font may be determined for a font involved in the font conflict. In other aspects, the substitute font may be modified based on the font conflict. In yet other aspects of the disclosure, one or more documents involved in the font conflict may be modified based on the modified information of the substitute font. According to still other aspects of the disclosure, upon modification, the one or more documents involved in the font conflict may be available for further processing. According to some aspects of the disclosure, the one or more documents may be modified a second time to restore their original state.

These and other novel advantages, details, embodiments, features and objects of the disclosure will be apparent to those skilled in the art from the following detailed description, the attached claims and accompanying drawings, listed herein.

BRIEF DESCRIPTION OF DRAWINGS

Certain embodiments are illustrated by way of example and not limited in the accompanying figures in which like reference numerals indicate similar elements and in which.

DETAILED DESCRIPTION

In the following description of the various embodiments, reference is made to the accompanying drawings, which form a part hereof, and in which are shown by way of illustration various embodiments in which the invention may be practiced. It is to be understood that other embodiments may be utilized and structural and functional modifications may be made without departing from the scope of the present invention.

Figure 1:
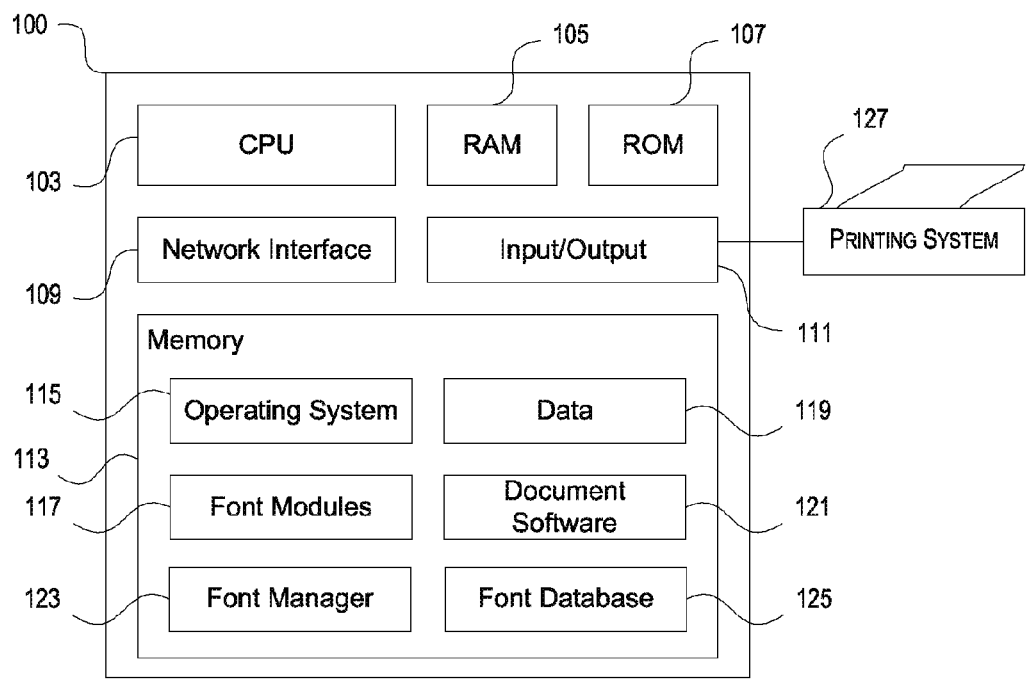
FIG. 1 illustrates an example data processing system configured to perform one or more illustrative aspects of the invention.

Aspects of this disclosure relate to a system and method for managing different fonts. Further, at least some aspects of this disclosure relate to systems and methods for accurately activating fonts used by one or more documents. With reference to FIG. 1, the methods and techniques described herein may be implemented in a computing system environment 100. Computing system environment 100 represents a generic computing device, e.g., a desktop computer, laptop computer, notebook computer, network server, portable computing device, personal digital assistant, smart phone, mobile telephone, distributed computing network device, or any other device having the requisite components or abilities to operate as described herein and, in some arrangements, be configured as a special-purpose device according to one or more illustrative aspects of the invention. Environment 100 may include central processing unit (CPU) or other processor 103, RAM or other volatile memory 105, ROM or other boot memory 107, network interface(s) 109 (e.g., Ethernet, wireless network interface, modem, etc.) through which a computing device (e.g., computing system environment 100) may connect to a network (e.g., Internet, LAN, WAN, PAN, etc.), input/output port(s) 111 (e.g., keyboard, mouse, monitor, printer, USB ports, serial ports, parallel ports, IEEE 1394/Firewire ports, and the like), and non-volatile memory 113 (e.g., fixed disk, optical disk, holographic storage, removable storage media, flash drive, etc.). Environment 100 may store various programs, applications, and data in memory 113, including, but not limited to, operating system software 115, font modules 117 (e.g., one or more plug-ins and/or other font software), data 119 (e.g., documents, font files, job jackets, and other data described herein), and other document software 121, such as document creation software and document processing software (e.g., ADOBE® brand applications, QUARK® brand applications, document printing applications, etc.). Document creation software may be any software presently known or developed in the future that may be used to create text, graphical, image, photographic, multimedia, or any other type of visually perceptible document. Document processing software may be any software presently known or developed in the future that may be used to process text, graphical, image, photographic, multimedia, or any other type of visually perceptible document.

One or more aspects of the disclosure may be embodied in computer-usable data and/or computer-executable instructions, such as in one or more program modules, executed by one or more computers or other devices to render one or more fonts for output on a device such as a display or a printer. Generally, program modules include routines, programs, objects, components, data structures, etc. that perform particular tasks or implement particular abstract data types when executed by a processor in a computer or other data processing device. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the invention, and such data structures are contemplated within the scope of computer executable instructions and computer-usable data described herein.

With further reference to FIG. 1, as discussed above, the computing system environment 100 may include document software 121 that interacts with operating system 115. Operating system 115 may contain application program interfaces for activating fonts globally. That is, in some arrangements, all processes running on the operating system 115 may access and use the activated fonts. Additionally or alternatively, operating system 115 may also provide the ability to activate fonts inside the process space of an application, which only that specific process can see and use. Operating system 115 may also provide a list of fonts currently activated on the computing environment 100.

In some arrangements, for a particular font to be activated in the computing environment 100, physical data related to the font may need to be installed in the computing environment 100 (e.g., the font files representing the characteristics of the font, etc.). In some embodiments, operating system 115 may store the data of installed fonts in a font folder. Additionally, operating system 115 may include a system registry database that maintains information regarding the installed fonts. Fonts may be installed by placing the appropriate data into the font folder and/or updating information in the system registry. When properly installed, the installed fonts may be activated. In some instances, activating the font may include identifying the location of the physical data for the installed font, such as by a path to the data and some identification of the physical data itself (e.g., a path to the font folder and the filename for the font file). When activated, an application of the computing environment may use one or more of the installed fonts. For example, the application may access the font files of the activated font and reproduce a font according to the font files.

In some arrangements, the computing system environment 100 may include a font module 117. In some arrangements, the font module 117 may include one or more font management plug-ins written and interface with a document processing application 121 (e.g., written to connect to Adobe, Quark, document printing applications, etc.) to assist the computing system environment 100 with managing and accurately activating fonts. In one instance, the font module 117 may include auto-activation plug-ins that automatically turns fonts on and off within an application. For example, plug-ins and/or XTensions may include support for Adobe® InDesign® CS4, Adobe Illustrator® CS4 and QuarkXPress 8, InCopy, CopyDesk, etc., as well as for Creative Suite 3 software applications and QuarkXPress 7. Auto-activation plug-ins operate in the background and provide users with the ability to seamlessly work in their chosen applications while automatically activating the fonts. In some arrangements, the font module 117 may interact with a font manager 123 and/or use the information from a font manager 123 to assist with managing and/or accurately activating fonts. The font module 117 may identify and prevent font conflicts before a document is processed. An example method of this is discussed in detail below.

In some arrangements, the computing system environment 100 may access a font database when activating fonts and/or handling other font related requests. For example, when a process executing on the computing system environment 100 requests information related to a font (e.g., determining if a font is installed on the system, populating a list of installed fonts, requests associated with activating a font, etc.), the operating system 115 may return information for one or more fonts that are installed in the computing system environment 100 and are responsive to the request. In one instance, the operating system 115 may receive a request for information related to fonts that are currently activated. In response, the operating system may send information about the currently activated fonts, such as the names of the activated fonts, the paths to the font files of the activated fonts, the activation level of the activated fonts, etc.

Additionally or alternatively, in some arrangements, computing system environment 100 may also include a font manager 123 configured to identify, activate and deactivate fonts. In embodiments having a font manager 123, the font manager 123 may install and/or activate fonts into the computing system environment 100. In some arrangements, the font manager 123 may access a font database 125. When a font is to be activated, the font manager 123 may install the font from the font database 125 into a memory space of the operating system 115 (e.g., by storing the font into the installed fonts database (not shown) of the operating system 115). When the font is deactivated, font manager 123 may remove the font from the memory space of the operating system 115 (e.g., by removing the font from an installed-fonts database (not shown) of the operating system 115). In some arrangements, by installing and/or removing fonts from the memory space of the operating system 115, the operating system may maintain knowledge regarding a small subset of total fonts that may be installed on the computer. In other arrangements, the font manager 123 may interact with document software 121, such as a document creation application, to identify fonts of a document and generate font identification keys for the identified fonts. An example method of this is discussed in detail below. In some embodiments, the font database 125 may be separate from the font manager 123 (e.g., a remote database accessible via network interface 109).

In some embodiments, computing system environment 100 may include a printing system 127 that interacts (e.g., through input/output ports 111) with various portions of the computing system environment 100 (e.g., operating system 115, document software 121, etc.). In some arrangements, a user may interact with computing system environment 100 to print a document using the printing system 127. For example, the user may interact with the document software 121 and/or operating system 115 to load a document and print the document using the printing system.

Various aspects of this disclosure relate to accurately activating fonts in a computing system environment. In some embodiments accurately activating fonts may include identifying a potential font conflict and resolving the potential font conflict before allowing further processing of the documents. For example, fonts associated with one or more documents and/or the computing system may be identified (e.g., a first font and a second font). Upon identification of the fonts, a potential conflict between the fonts may be identified (e.g., a potential conflict between the first font and the second font). Based on the identified conflict, or potential conflict, information related to the potential conflict may be modified to resolve the potential conflict before allowing further processing of the document (e.g., information of the first font, information of the second font, and/or information of the one or more documents). Upon modifying the appropriate information, the documents involved in the potential conflict may be available for further processing, using the modified information.

Figure 2:
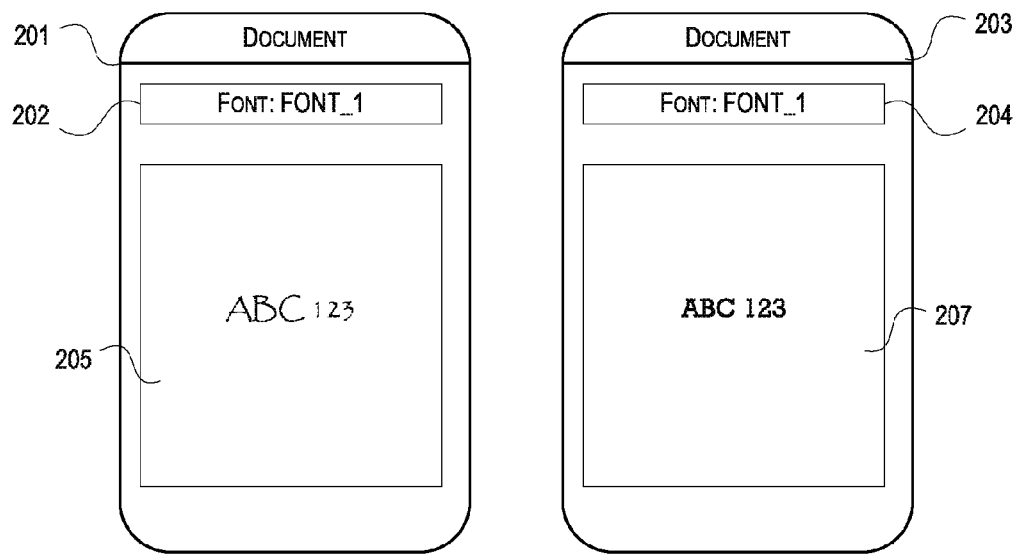
FIG. 2 illustrates two example documents having a potential font conflict between the fonts of the documents.

A font conflict can arise between fonts installed on the computing environment, fonts currently activated in the computing environment, and/or fonts associated with one or more documents. One example of a potential font conflict that may be identified, resolved, etc., is the conflict resulting from fonts having the same identifying information. Under certain conditions, fonts having the same identifying information may conflict, thereby causing one or more documents to be processed incorrectly (e.g., printed incorrectly, viewed incorrectly, etc.). The identifying information of a font may include the name of the font, such as a Postscript or TrueType name. The identifying information of a font may also include a filename, a file location, and/or any identifier for a specific font. FIG. 2 illustrates two example documents having a potential font conflict between the fonts of the documents. Specifically, FIG. 2 illustrates a font conflict arising out of documents including fonts that have the same identifying information. In addition to the potential conflict illustrated in FIG. 2, conflicts may arise from fonts having the same identifying information. In one example, a potential font conflict may exist between a font of a document and a system font of the computing environment.

Referring now to the illustrated example of FIG. 2, a first document 201 includes a font, identified by its name, FONT_1 202, which may be used in reproducing and/or rendering the document 201. Content area 205 illustrates example text rendered using FONT_1 202. As also shown in FIG. 2, a second document 203 identifies a font, also named FONT_1 204, which may be used in reproducing and/or rendering the document 203. Content area 207 of the second document 203 includes example text rendered using FONT_1 204 as identified with/by the second document 203. Although the first document 201 and the second document 203 identify a font having the same name (i.e., the same identifying information), the appearance of the text rendered using the two fonts 202, 204 is clearly different. First document 201 and second document 203 illustrate just one example instance in which the documents 201, 203 may be incorrectly processed by a computing system because of the conflict between the identifying information of the fonts 202, 204 (e.g., the font name: FONT_1).

Fonts having the same identifying information may be produced in various ways. For example, fonts having the same identifying information may be produced by a font foundry. In one example, a font foundry may produce one font having a particular Postscript name (e.g., Helvetica, Courier, etc.), and may produce a second font having the same particular Postscript name (e.g., different version of Helvetica, Courier, etc.). When processing documents using the first and second font, the identifying information of the first and second fonts may be substantially the same or similar but text rendered using those fonts may have different appearances, thereby causing a font conflict. As another example, fonts having the same identifying information may be produced by multiple font foundries. For instance, a first font foundry may produce a first font having a particular Postscript name (e.g., Helvetica, Courier, etc.), and a second font foundry may produce a second font having the same particular Postscript name (e.g., Helvetica, Courier, etc.). Accordingly, when processing documents using the first and second font, the identifying information of the first and second fonts may be substantially the same or similar but text rendered using those fonts may have different appearances, thereby causing a font conflict.

Figure 3:
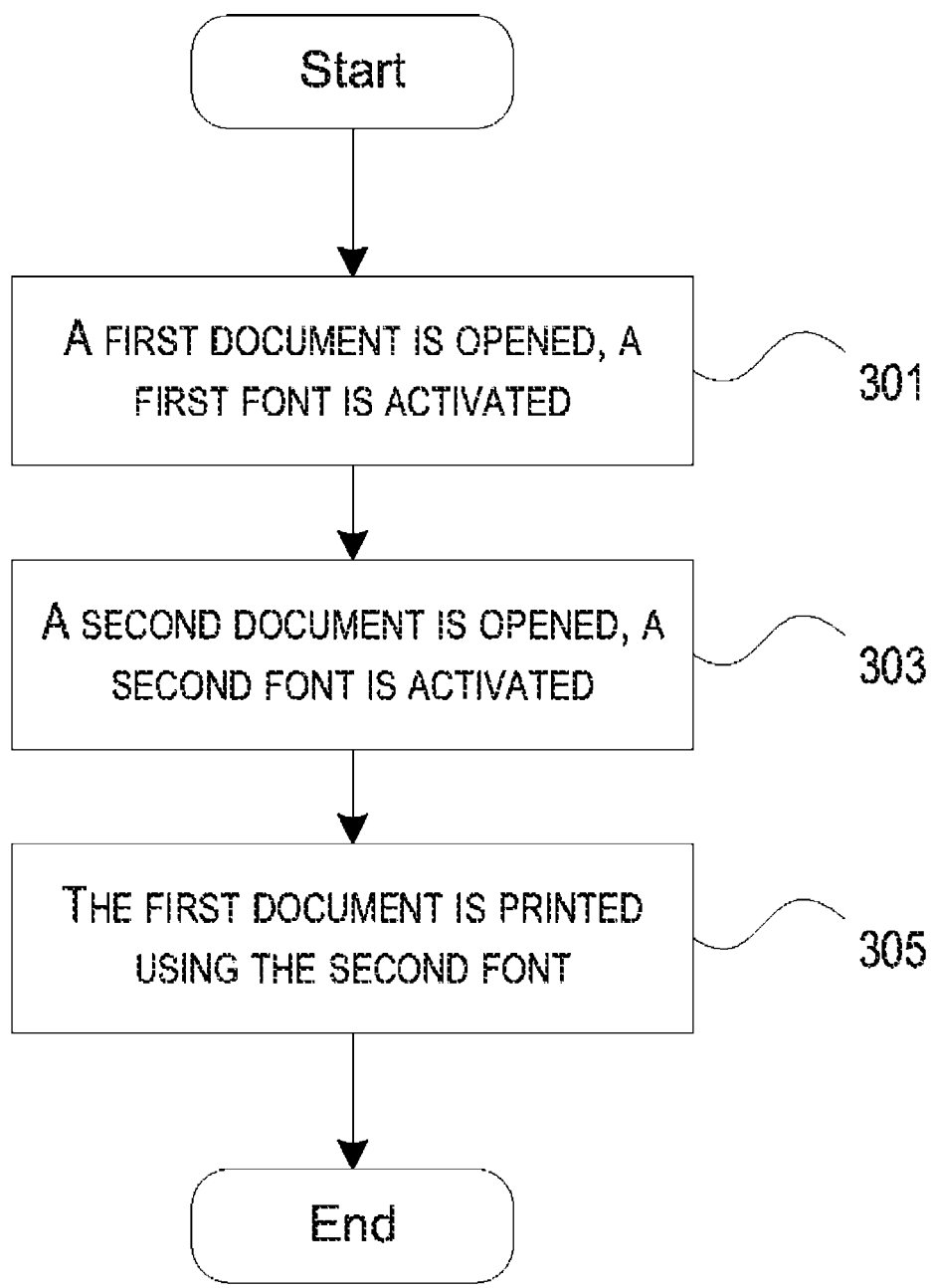
FIG. 3 illustrates one or more possible effects caused by an example font conflict.

Referring again to FIG. 2, when a computing system processes document 201 and/or document 203 (e.g., rendering, loading, viewing, printing, etc.), the font conflict may arise and cause the wrong font to be activated and/or used (e.g., rendered using the incorrect fonts, loaded using incorrect fonts, viewed using incorrect fonts, printed using incorrect fonts, etc). Accordingly, activating and/or using fonts that are involved in a font conflict (e.g., fonts that conflict with each other) may cause the document to be processed incorrectly (e.g., text rendered in the documents 201, 203 may appear incorrectly). FIG. 3 illustrates one or more possible effects caused by an example font conflict. It is noted that the example of FIG. 3 illustrates one or more possible effects of the font conflict illustrated in FIG. 2. Other effects and other conflicts are possible. For example, another effect may include the effects of rendering documents using the incorrect fonts. Similar effects may arise based on other conflicts, including conflicts between a font of a document and a font of a system font. Specifically, FIG. 3 illustrates one or more possible effects of a font conflict caused by conflicting identifying information. With respect to the illustrated conflict of FIG. 2, the effects illustrated in FIG. 3 may arise when documents 201, 203 are processed (e.g., printed as in FIG. 3) because of the conflict between fonts 202, 204.

In some arrangements, the incorrect processing of the documents results from fonts having conflicting identifying information. The conflicting information causes the incorrect font to be used when the document is processed. As shown in step 301 of FIG. 3, a first document is opened, and a first font is activated in the computing system. In some embodiments, activating the first font includes identifying the physical data for the first font on the computing system (e.g., the font files for the first font) and providing for access to that data based on the identifying information of the first font. For example, after the first font has been activated, an application processing the first document may require access to the font files of the first font (e.g., when the first document is rendered, printed, etc.). The application may receive access to the font files via the activated font having the identifying information of the first font.

At step 303, a second document is opened, and a second font is activated. In some instances, the first font and the second font may have the same or similar identifying information (e.g., same or similar font name, such as the same Postscript name, etc.). In some arrangements, because of the conflicting identifying information, when the second font is activated the second font may replace the first font as the activated font for that identifying information. When the second font replaces the first font as the activated font, an application processing the first document may receive access to the font files of the second font, instead of receiving access to the font files of the first font. Thus, activating and/or using fonts that have the same identifying information may result in a font conflict and incorrect document processing.

Step 305 of FIG. 3 illustrates one example where the first document may be incorrectly processed after the second font has been activated. In step 305, the first document is printed by the computing system using the second font (e.g., the most-recent activated font having the same identifying information). Printing may include accessing the activated font matching the identifying information of the first font and printing the document based on the characteristics of the activated font. Since the second font has replaced the first font as the activated font for that identifying information, the font files for the second font are used by computing system when the first document is printed. Thus, the first document may not print as intended. For example, the kerning or some other visual font characteristic may be different between the first and second fonts (e.g., font spacing, etc.). Such differences may affect the printed document in various ways, including the reflowing of text on the document's pages, visual inaccuracies of the printed document, etc. Additionally or alternatively, such effects may be difficult for a user to notice and/or may cause cost overruns, including, for example, cost overruns associated with reprinting the document.

Further, various factors may determine whether a font conflict arises to cause the computing system to incorrectly process documents involved in the font conflict. In some arrangements, whether a font conflict arises may depend on the timing of the font activation and/or the document processing. For example, a computing system may be capable of processing multiple documents in parallel. When processing the documents in parallel, correct processing of the documents may depend on whether the last font activated by the computing system is the correct font for the document (e.g., the font used by the designer when creating the document). In one particular parallel processing timing sequence, the correct font may be the last activated font, thereby allowing the computing system to correctly process the documents. Under a different parallel processing timing sequence, the incorrect font may be the last activated font, thereby causing the computing system to incorrectly process the documents in a manner described above.

Additionally and/or alternatively, whether a font conflict arises may depend on the operating system of the computing system. For example, if the conflicting font is activated by the operating system in the local process space and not globally, the computing system may process the document correctly when the documents having the conflicting fonts are not processed in the same, local process space. However, if the conflicting fonts are activated globally, the computing system may process the documents incorrectly. In light of these considerations regarding whether a font conflict arises, a font conflict may be difficult to detect in conventional manners (e.g., inspection by a user, etc.). However, as described in more detail below, the system may prevent the font conflict from occurring by identifying a potential font conflict and resolving the potential font conflict before further processing of the document. Thus, by preventing the font conflict from occurring, the documents may be processed without regard to how the system will process the document (e.g., serially or parallel) and/or the type of operating system of the computing system.

According to various aspects of the disclosure, a computing system (e.g., computing system environment 100 of FIG. 1) may be configured to perform steps to prevent a font conflict (e.g., the font conflict illustrated in FIG. 2) from arising and, thereby, causing the documents to be processed incorrectly. In some embodiments, the computing system may prevent the font conflict using one or more font modules (e.g., font module 117 of FIG. 1), the operating system of the computing system (e.g., operating system 114 of FIG. 1), a document processing application of the computing system, a document creation application of the computing system, a font manager, a font database, and/or some combination thereof, etc. In some arrangements, a font manager may interface with a document creation program to provide correct font information for the fonts of a document so that additional information related to the fonts of a document is available when preventing a font conflict.

Figure 4:
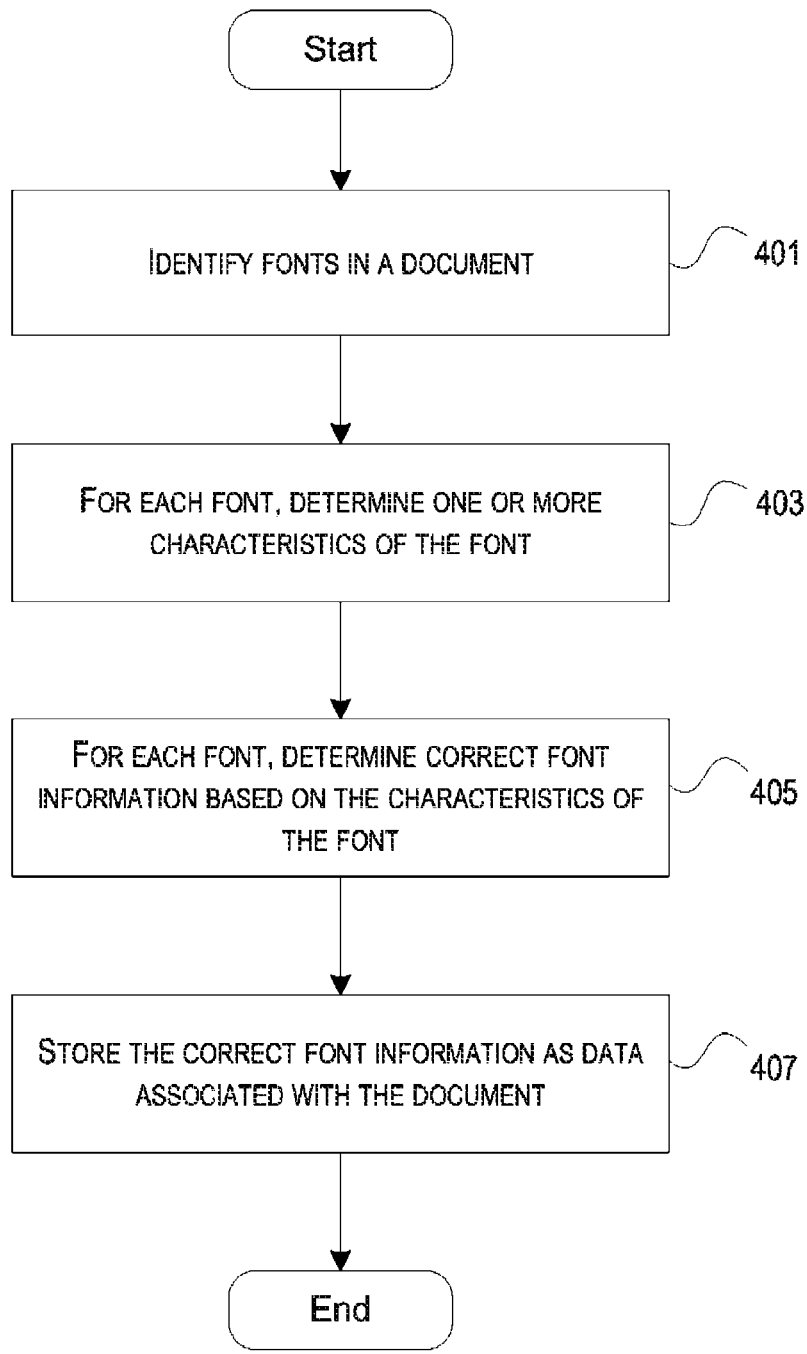
FIG. 4 illustrates an example method of providing correct font information for fonts of a document.

FIG. 4 illustrates an example method of providing correct font information for fonts of a document. As seen in step 401, the fonts of a document are identified. For example, in arrangements where a font manager is interfaced with a document creation program, the font manager may identify fonts of the document currently being designed in the document creation program. In one such example, the font manager would determine which fonts are currently used in the document being designed.

In step 403, characteristics of each identified font are determined. In some arrangements, characteristics of the font may include the font type, the font name, the font version, the font foundry, and/or other information related to the visual characteristics of the font (e.g., information about the font's outlines, width tables, kerning tables, etc.). The characteristics of a font may be determined from various sources. For example, the characteristics may be determined from the document, the activated fonts of the computing system, the fonts installed on the computing system, and/or fonts in a font database. In one instance, the characteristics are determined from the font files being used by the document creation software to render the document being designed (e.g., font files associated with an activated font that corresponds to the name of the font being used by the document).

In step 405, for each font, correct font information is determined based on the characteristics of the font. The correct font information may specify the characteristics of the font. By specifying the characteristics, the correct font information may provide information that allows for the same font files to be later identified when the document is processed. For example, the correct font information may include information that allows for the version, foundry, type, and/or name of the font to be later identified. Additionally, the correct font information may also include an error detection code based on one or more of the determined characteristics. In some embodiments, this error checking code may take the form of a checksum value based on information about the visual characteristics of the font. In one example, the checksum value is determined from information related to the font's outlines, width tables and kerning tables. The correct font information may take various forms, including a collection of data including one or more of the characteristics, a multi-value key specifying one or more of the characteristics, etc.

In step 407, the correct font information is stored as data associated with the document. In some arrangements, the correct font information may be stored as one or more separate files that are associated with the document. In other arrangements, the correct font information may be inserted as metadata to the document. Storing the correct font information and associating the stored data with the document being designed, allows for the correct font information to be later accessed. In one example, the stored data may be accessed by a font module and/or a document processing program so that the correct font information may be leveraged to provide additional information, such as information that identifies the actual font files used when the document was designed.

Figure 5:
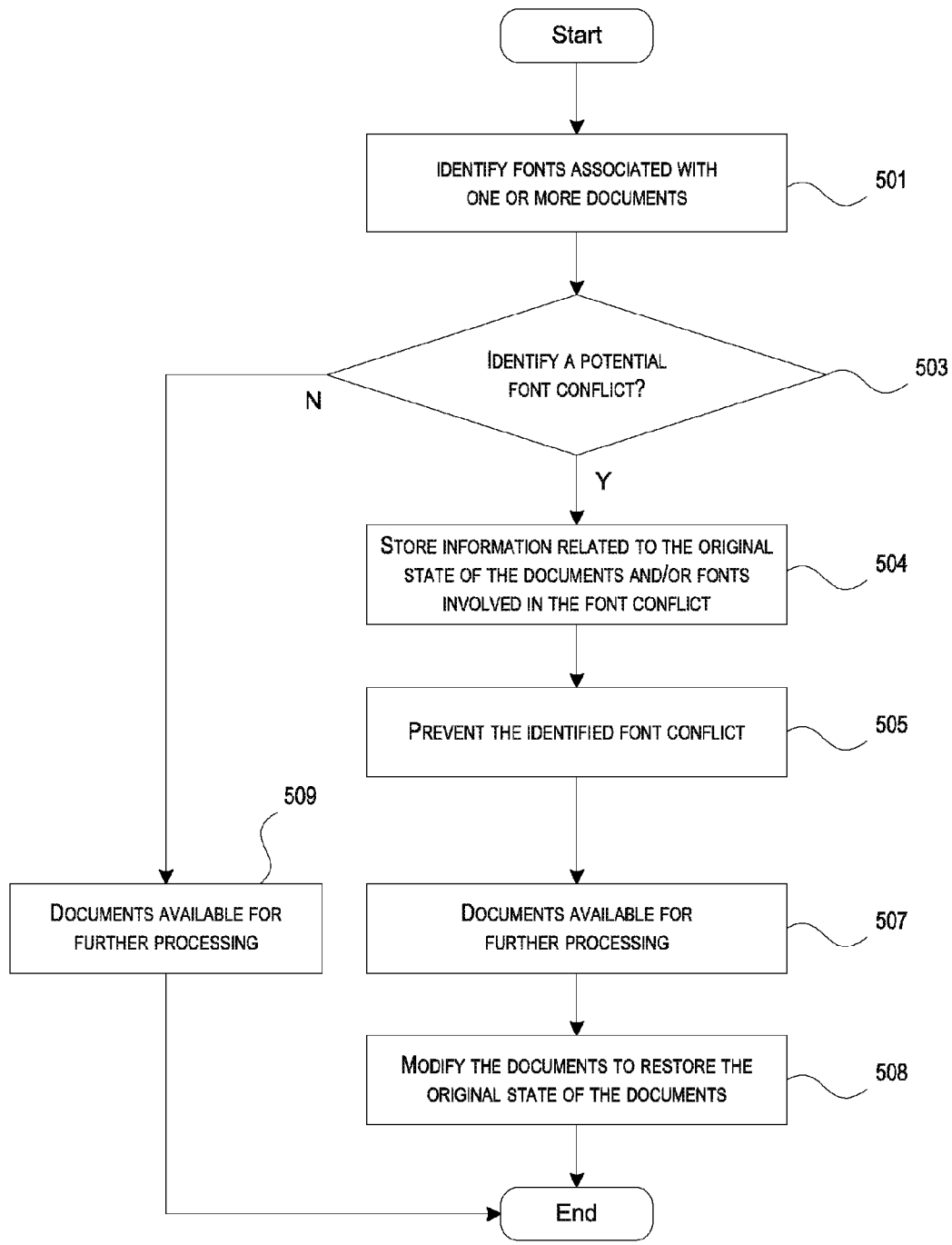
FIG. 5 illustrates an example method whereby a font conflict may be prevented.

In some arrangements where the computing system prevents a font conflict, a font module may interface with a document processing program to provide font conflict resolution and/or accurate font activation before a document is processed (e.g., printed, rendered, etc.). FIG. 5 illustrates an example method whereby the computing system may prevent a font conflict, according to at least some aspects of the disclosure. Although this example method illustrates the font module as identifying and preventing a font conflict, various aspects, components, etc. or combinations thereof, of the system may be used in dealing with the conflict or potential font conflict. For instance, a font manager may be used to identify and prevent a font conflict. Additionally or alternatively, the computing system may generally be used to identify and prevent a font conflict. As illustrated in FIG. 5, at step 501, one or more fonts associated with one or more documents may be identified. For example, a font module may identify one or more fonts necessary to reproduce a document in a document processing application. In some embodiments, the document may be in a format that contains the fonts necessary to reproduce it. Therefore, the font module may identify the fonts associated with the document by processing the document itself. In one example, a document may be in the Portable Document Format (PDF). PDF embeds the fonts necessary to reproduce the document within the file containing the document. In other embodiments, the document may include identifying information that identifies the fonts necessary to reproduce the document. For example, the identifying information may be a font name, such as a Postscript name.

Additionally or alternatively, additional data may be included with the document file. For example, one or more additional files may be associated with the document file. In one example, these additional files may contain the fonts needed to reproduce the document, and/or fonts identified in the document file. Thus, the font module may identify the fonts associated with the document using the additional files. Such additional files may be included in a job jacket. The job jacket may include files that identify the fonts necessary to reproduce the document. In some arrangements, the job jacket may comprise a formatted file having the same name as the original document, but with a different file extension, e.g., XML, JKT, etc. The job jacket may also include references to one or more fonts and the document. The job jacket may comprise any document format desired, and is not limited to an XML or even specifically a markup language document, but rather may be any format provided the requisite information is included therein.

As another example, the one or more additional files may be included as part of a print job, which may be provided to a pre-press operator for printing. In some arrangements, the print job may be provided on portable media, e.g., USB flash drive, optical disk, or the like, and/or may be transmitted via one or more networks, e.g., over the Internet. The print job may further be encapsulated in a file encapsulation and/or compression format, e.g., .ZIP, .TAR, etc.

At step 503, a potential font conflict is identified (e.g., a determination is made whether a font conflict could arise). In various embodiments, the font module may identify a potential font conflict based on an examination of the identified fonts, fonts installed and/or activated on the computing system, the documents from which the fonts were identified, and/or the activation level of the identified fonts. With respect to conflicts based on an activated font, the font module may, in some instances, examine one or more of the globally activated fonts, one or more of the locally activated fonts, and/or some combination thereof. The font module may identify a potential font conflict based on the identifying information of the font(s) (e.g., Postscript names of one or more of the fonts active in the computing system). If a Postscript name of an active font is the same as the Postscript name of an identified font, the font module may identify this as a potential font conflict and may proceed to step 504. As another example, the font module may identify a potential font conflict based on whether an identified font has the same or similar identifying information (e.g., Postscript name) as one or more of the fonts identified in step 501. Additionally or alternatively, even if two or more fonts have the same or similar identifying information, whether a font conflict is identified may be based on the activation level of the fonts. For example, a font conflict may exist between fonts if both fonts are activated globally. Thus, this may situation may be identified as a potential font conflict. However, if the two fonts are activated in different process spaces, the font conflict may not arise and a potential font conflict may not be identified.

If a potential font conflict is not identified, the documents may be made available for further processing in step 509. The font module may not identify a font conflict based on various font information, activation levels, etc. For example, fonts being activated only locally in different process spaces may not identify as a conflict. As another example, the identifying information between the identified fonts and/or activated fonts may be different.

If a potential font conflict is identified, information relating to the original state of the documents and/or fonts involved in the font conflict may be stored in optional step 504. In some arrangements, this may include storing information related to the documents and fonts involved in the font conflict that corresponds to the font conflict. For example, the font module may store the identifying information of the fonts involved in the font conflict (e.g., the Postscript name of the fonts involved in the font conflict). In some arrangements, the font module may store references to the documents (and/or references to portions of the documents) that include the conflicting fonts.

In step 505, the font conflict may be prevented. According to aspects of the disclosure, the font module may prevent the identified conflict in various manners. For example, the font module may modify information of one or more fonts involved in the font conflict, and may modify one or more documents involved in the font conflict so that the one or more documents include the modified information of the modified fonts. Prevention of font conflicts will be discussed more fully below.

In step 507, the documents may be made available for further processing (e.g., printing, viewing, rendering, editing, etc.). Accordingly, when further processing is performed on the documents, the intended fonts may be used during the processing (e.g., a font is activated according to the modified information thereby allowing the correct font files to be accessed when processing the document). At optional step 508, the documents may be further modified to restore the original state of the documents. In some arrangements, this step may not be performed. For example, if the documents were not modified, their original state does not need to be restored and this step may skipped. Alternatively, this step may first determine whether the documents have been modified, and proceed with restoring the original state of the documents if the documents have been modified from their original state. In some instances, the font module may modify a document that was changed during step 505 to prevent a potential conflict. In optional step 508, the font module may substitute the original identifying information into the document to restore the document's original state. For example, if a first document originally referencing font "Helvetica" was modified to refer to a modified font having a Postscript name of "Helvetica123XYZ" the first document would be modified a second time to replace any occurrence of "Helvetica123XYZ" with the original identifying information (e.g., "Helvetica"). In some embodiments, the font module may access the information stored during optional step 504 and restore the document to an original state based on the stored information and/or the information determined in step 503 that could cause the font conflict. For example, the font module may access the stored information to retrieve the original identifying information of a font involved in the font conflict (e.g., "Helvetica") and modify the document so that wherever the document references the font, the document uses the original identifying information (e.g., substituting any reference to identifying information of the modified font with "Helvetica").

Figure 6:
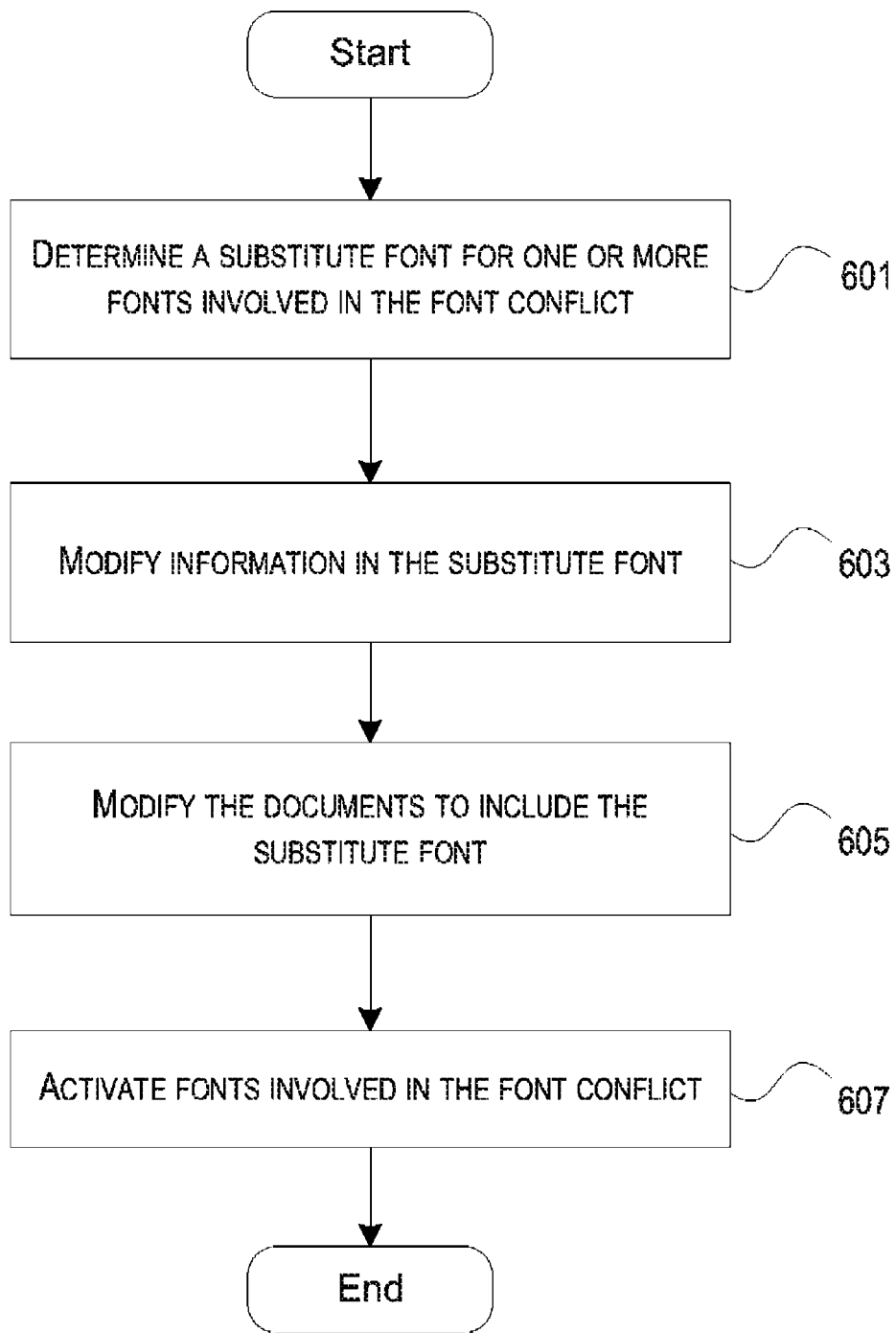
FIG. 6 illustrates an example method of preventing a font conflict, according to one or more aspects of this disclosure.

FIG. 6 illustrates an example method of preventing a font conflict, according to one or more aspects of the disclosure. At step 601, a substitute font for one or more fonts involved in the font conflict is determined. In some arrangements, the substitute font is determined based on the identifying information of the font involved in the conflict. For example, in some arrangements, the font module may determine a substitute font based on the Postscript name of a font involved in the conflict. In one such example, the font module may access a font database, and based on the font name, retrieve a font which will be used as the substitute font.

In other arrangements, the substitute font may be determined based on additional information. For example, the font module may use the correct font information that was associated with the document when the document was designed (e.g., the correct font information of FIG. 4). As discussed above, the correct font information may include information that specifies the characteristics of the font that was used when the document was created. The correct font information, which, in some instances, includes a font type, name, foundry, version, error checking code, etc., may be used to determine the substitute font. In one example, the substitute font may be a font that is the same as the correct font information. Thus, the determined substitute font may have the same font type, name, foundry, version, etc. as the correct font information. In another example, the substitute font may be a font that is similar to the correct font information. Thus, the determined substitute font may have some characteristics in common with the correct font information (e.g., font name, font version), and other characteristics that are different than the correct font information (e.g., font foundry).

In some instances, when determining the substitute font, the font module may need to determine the substitute font from a number of candidate fonts. To select the substitute font from the plurality of candidates, the font module may use various techniques. One technique may be to select the font which has the most matching characteristics. A second technique may be to consider some characteristics of the correct font information as more important than others. For example, the font foundry characteristic may be considered as less important than the font name and/or the font version characteristic (e.g., a different font foundry may indicate only that the font was licensed to a different font foundry). Thus, in one such instance, if two candidate fonts both match the correct font information in all characteristics except one, with the first candidate differing in the font version characteristic and the second candidate differing in the font foundry characteristic, the font module may select the second candidate as the substitute font. A third technique may be to use the error checking code that may be included in the correct font information. As discussed above, the error checking code may be based on the visual characteristics of a font. Thus, a font having a matching code may be the same font, or a font that is visually similar. In one example, the font module may determine a code for the candidates using the same function that generated the error checking code of the correct font information. From the candidate codes, the substitute font may be selected as the candidate that has a code matching the error checking code. One skilled in the art can appreciate that other techniques could be used to select among the candidates, including, for example, a hybrid technique that combines two or more of the techniques described above.

Additionally or alternatively, the font module may access various font sources when determining the substitute font. For example, the font module may access the fonts installed on the computing system, and/or may access a separate font database (e.g., a font database associated with a font manager). In some arrangements, the font module may determine the substitute font from the separate font database and install the substitute font onto the computing system. In other arrangements, the font module may install the substitute font onto the computing system when the substitute font is not found on the computing system.

At step 603, information in the substitute font may be modified. In some arrangements, the font module may modify the identifying information of the substitute font. For example, the font module may append to the identifying information an alphanumeric string of characters so that the identifying information of the substitute font is different than the identifying information of other fonts involved in the font conflict (e.g., appending "123XYZ" to a Postscript name of "Helvetica" to create new identifying information of "Helvetica123XYZ"). In other arrangements, the font module may substitute the identifying information with new identifying information. For example, the font module may generate an alphanumeric string of characters and replace the identifying information of a conflicting font with the alphanumeric string (e.g., replacing the conflicting Postscript name of one of the fonts involved in the font conflict with "123XYZ"). In yet other arrangements, the font module may append or substitute the identifying information based on the correct font information. For example, the Postscript name of the substitute font may be appended/substituted with one or more characteristics included in the correct font information so that the Postscript name of the substitute font no longer conflicts with the Postscript names of other fonts involved in the conflict. In step 605, documents may be modified to include the substitute font. For instance, the document(s) may be modified to reference the substitute font instead of the original, conflicting font. For example, if a font conflict exists between a first font of a first document having identifying information of "Helvetica" and a second font of a second document having the same identifying information, the font module may modify the first document and/or the second document. In some arrangements, the font module may modify the first document if the font module determined a substitute font for the first font (e.g., determined a substitute font and modified its identifying information to "Helvetica123XYZ"). Accordingly, the font module may modify the first document so that any reference to the conflicting information of "Helvetica" is replaced by the modified information of the substitute font (e.g., "Helvetica123XYZ"). In other arrangements, the font module may modify the second document if the font module determined a substitute font for the second font (e.g., determined a substitute font and modified its identifying information to "Helvetica_v3_0"). Accordingly, the font module may modify the second document so that any reference to the conflicting information of "Helvetica" is replaced by the modified information of the substitute font (e.g., "Helvetica_v3_0").

In optional step 607, the fonts involved in the font conflict may be activated. In some embodiments, the font module may activate only the substitute font. In other embodiments, the font module may activate any and/or all of the fonts involved in the font conflict. In yet other arrangements, the font module may activate only the fonts which are not currently activated on the computing system. Additionally, in some arrangements, if the substitute font is not yet installed in the computing system, the font module may install the substitute font before activating the substitute font. In some embodiments, step 607 is optional because font activation may occur upon and/or during further processing of the document.

Various aspects of the disclosure may thus provide a number of benefits to a user when processing documents, such as a creative professional or pre-press operator. For example, a creative professional printing multiple documents may avoid worry related to which fonts are active on a system, as font conflicts between the documents may be prevented before the documents print. Additionally and/or alternatively, batch printing of documents may be automated, regardless of whether a document in the print job contains fonts having the Postscript names the same as system fonts necessary to run the operating system. Therefore, multiple documents may be printed at the same time or processed in parallel, even if the documents contain conflicting fonts. Accordingly, the documents may print as the creative professional and/or the designer intended.

The methods and features recited herein may further be implemented through any number of computer readable media that are able to store computer readable instructions. Examples of computer readable media that may be used include RAM, ROM, EEPROM, flash memory or other memory technology, CD-ROM, DVD or other optical disk storage, magnetic cassettes, magnetic tape, magnetic storage and the like.

While particular embodiments of the present invention have been described and illustrated, it should be understood that the invention is not limited thereto since modifications may be made by persons skilled in the art. The present application contemplates any and all modifications that fall within the spirit and scope of the underlying invention disclosed and claimed herein.

What is claimed is:

1. One or more non-transitory computer readable media storing computer readable instructions that, when executed, cause an apparatus to:
   identify a first font that is required for processing a first document;
   determine a match between one or more characteristics of the first font and one or more characteristics of a second font; and
   responsive to determining the match between the one or more characteristics of the first font and the one or more characteristics of the second font:
   determine a substitute font for the first document;
   modify information of the substitute font based on the match, resulting in modified information of the substitute font; and
   based on the modified information of the substitute font, modify the first document such that the substitute font is required for processing the first document instead of the first font.

2. The one or more non-transitory computer readable media of claim 1, wherein causing the apparatus to determine the substitute font includes causing the apparatus to:
   compare characteristics of a plurality of candidate fonts to characteristics of correct font information associated with the first document; and
   select the substitute font from the plurality of candidate fonts based on the comparison.

3. The one or more non-transitory computer readable media of claim 1, storing further computer readable instructions that, when executed, cause the apparatus to:
   store information related to the first font before modifying the first document, wherein the stored information includes information related to the first font or information related to the first document;
   perform further processing of the first document, wherein the substitute font is required to perform the further processing of the first document; and
   subsequent to performing the further processing of the first document, modify the first document a second time based on the stored information such that the first font is required for processing the first document instead of the substitute font.

4. The one or more non-transitory computer readable media of claim 1, wherein causing the apparatus to determine the match includes causing the apparatus to:
   compare identifying information of the first font to identifying information of the second font; and
   determine that the identifying information of the first font and the identifying information of the second font are the same.

5. The one or more non-transitory computer readable media of claim 4, wherein the identifying information of the first font is at least one of a TrueType name or a Postscript name of the first font, and wherein the identifying information of the second font is at least one of a TrueType name or a Postscript name of the second font.

6. The one or more non-transitory computer readable media of claim 2, storing further computer readable instructions that, when executed, cause the apparatus to:

activate the substitute font based on the modified information of the substitute font; and
print the first document using the substitute font.

7. A method comprising:
identifying a first font that is required for processing a first document;
determining, by a computer, a match between one or more characteristics of the first font and one or more characteristics of a second font; and
responsive to determining the match between the one or more characteristics of the first font and the one or more characteristics of the second font:
   determining a substitute font for the first document;
   modifying, by the computer, information of the substitute font based on the match, resulting in modified information of the substitute font; and
   based on the modified information of the substitute font, modifying, by the computer, the first document such that the substitute font is required for processing the first document instead of the first font.

8. The method of claim 7, further comprising:
activating the substitute font in a computing system;
wherein, upon activating the substitute font in the computing system, the substitute font is accessible by an application of the computing system when processing the first document.

9. The method of claim 7, wherein determining the substitute font includes:
comparing characteristics of a plurality of candidate fonts to characteristics of correct font information associated with the first document; and
selecting the substitute font from the plurality of candidate fonts based on the comparing.

10. The method of claim 9, further comprising:
storing information related to the first font before modifying the first document, wherein the stored information includes information related to the first font or information related to the first document;
performing further processing of the first document, wherein the substitute font is required to perform the further processing of the first document; and
subsequent to performing the further processing of the first document, modifying the first document a second time based on the stored information such that the first font is required for processing the first document instead of the substitute font.

11. The method of claim 7, wherein determining the match includes:
comparing identifying information of the first font to identifying information of the second font; and
determining that the identifying information of the first font and the identifying information of the second font are the same.

12. The method of claim 7, further comprising:
activating the substitute font based on the modified information of the substitute font; and
printing the first document using the substitute font.

13. An apparatus comprising:
at least one processor; and
memory operatively coupled to the processor and storing computer readable instructions that, when executed by the at least one processor, cause the apparatus to:
   identify a first font that is required for processing a first document;
   determine a match between one or more characteristics of the first font and one or more characteristics of a second font; and
   responsive to determining the match between the one or more characteristics of the first font and the one or more characteristics of the second font:
      determine a substitute font for the first document;
      modify information of the substitute font based on the match, resulting in modified information of the substitute font; and
      based on the modified information of the substitute font, modify the first document such that the substitute font is required for processing the first document instead of the first font.

14. The apparatus of claim 13, wherein causing the apparatus to determine the substitute font includes causing the apparatus to:
compare characteristics of a plurality of candidate fonts to characteristics of correct font information associated with the first document; and
select the substitute font from the plurality of candidate fonts based on the comparison.

15. The apparatus of claim 14, wherein the memory stores further computer readable instructions that, when executed by the at least one processor, cause the apparatus to:
store information related to the first font before modifying the first document, wherein the stored information includes information related to the first font or information related to the first document;
perform further processing of the first document, wherein the substitute font is required to perform the further processing of the first document; and
subsequent to performing the further processing of the first document, modify the first document a second time based on the stored information such that the first font is required for processing the first document instead of the substitute font.

16. The apparatus of claim 13, wherein causing the apparatus to determine the match includes causing the apparatus to:
compare identifying information of the first font with identifying information of the second font; and
determine that the identifying information of the first font and the identifying information of the second font are the same.

17. The apparatus of claim 13, wherein the memory stores further computer readable instructions that, when executed by the at least one processor, cause the apparatus to:
activate the substitute font based on the modified information; and
print the first document using the substitute font.

18. The method of claim 7, wherein modifying information of the substitute font based on the match includes changing a font name of the substitute font.

19. The method of claim 7, wherein modifying the first document includes replacing a reference to the first font within the first document with a reference to the substitute font.

20. The one or more non-transitory computer readable media of claim 1, wherein the one or more characteristics of the first font include two or more of the following: name, version, foundry, type, font outline information, width table information, or kerning table information.

21. The method of claim 7, wherein determining the match is part of a process for identifying a font conflict between the first font and the second font and wherein determining a substitute font, modifying the information of the substitute font, and modifying the first document are performed as part of a process for resolving the font conflict.

22. The method of claim 21, wherein the process for identifying the font conflict includes examining an activation level of the first font and an activation level of the second font.

* * * * *